7658X
J. Buffington.
Meat and Fruit Cutter.
Patented Jul. 5, 1833.
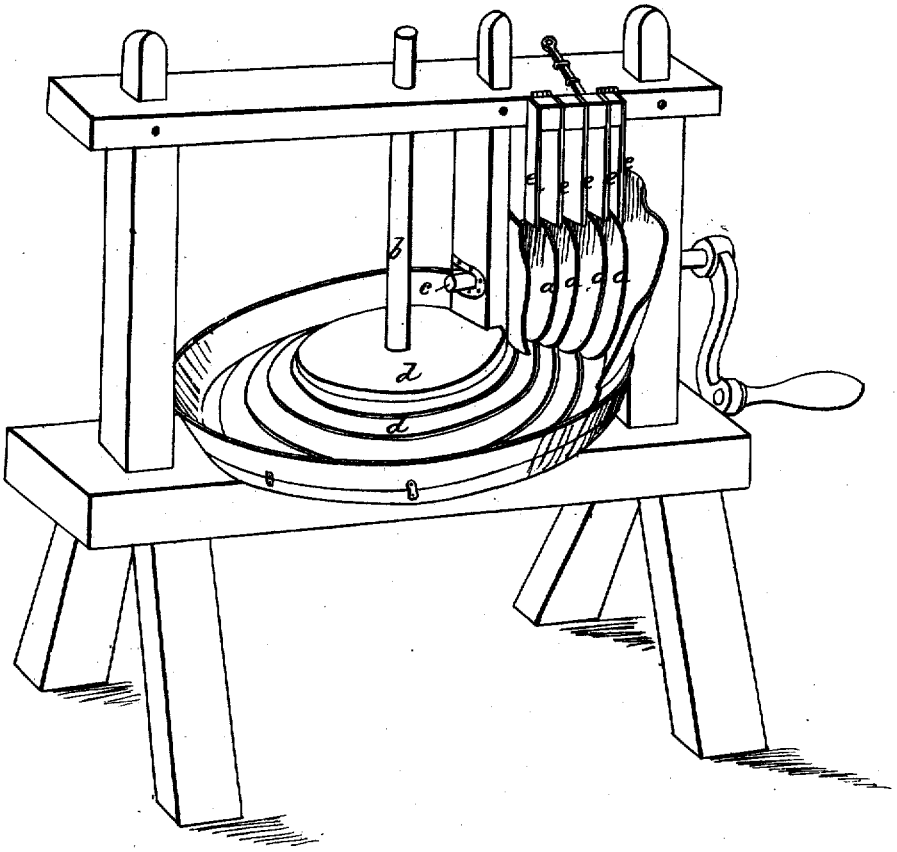
Inventor;
Joseph Buffington
THE NORRIS PETERS CO., WASHINGTON, D. C.

X7658 July 5. 1832 17

Joseph Buffington
Letters Patent

The schedule referred to in these Letters Patent and mak-
ing part of the same containing a description in the words of
the said Joseph Buffington himself of his improve-
ment or combination of Machinery for cutting into small
pieces flesh, fruit, vegitables or any other soft substances.
The tub or vessel in which the substance to be cut is placed
must be circular, of a depth sufficient to hold the quantity
to be cut at one time, the inside of its bottom forming an
inclined plane from the centre to the periphery at a slight
inclination. Thro' the centre of this tub or vessel passes
a shaft around which either the tub or vessel may be made
to revolve or the tub or vessel may be made stationary & the
cutting knives herein after described may revolve within it.
The cutting knives may be made of metal say iron with
steel edges they are in the form of a disk. There may be
any number of them so as to fill the whole distance between
the ~~the~~ centre and the periphery of the tub or they may be
limited in which case they are placed successively nearest
the periphery: whatever number there may be, they grad-
ually diminish in size from the periphery toward the centre, cor-
responding to the inclination of the inside bottom of the tub.
These cutting knives are fixed upon a horizontal shaft which
when the tub or vessel revolves, is turned by a winch which may
be moved by the hand or machinery. but when the tub or
vessel is stationary one end of this shaft is fastened to
the first mentioned shaft in the centre of the tub & the other
end of this second mentioned shaft being made to revolve
around the tub or vessel carries with it the knives. —
The revolutions of the tub or vessel when it is intended
to revolve are caused by the friction of the cutting knives
[illegible]

X7658 upon the inside of the inclined bottom whatever number of cutting knives there may be they must be placed a short distance apart. this may vary according to the article to be cut. For cutting meat when the cutting knives are seven & a half inches in diameter I generally place the cutting knives five eighths of an inch apart. Between each knife I place a piece of metal one end of which being fixed to a horizontal cross piece in which the machine is fixed. the other slightly touches the cutting knives on the upper side the object of which is to clean off any part of the substance intended to be cut which may adhere to the knives — What I claim as my invention & discovery, is the new & useful improvement above described of cutting knives in the form of dishs gradually diminishing in size revolving within the tub or vessel in which the substance to be cut is placed & when the tub or vessel is required to revolve, causing it to revolve by the friction of the cutting knives of the inclined bottom of the tub.

Joseph Buffingto[n]

Witness
Hor. E. Browne
Geo. R. Hrehn (Patented 5 July 1833)
(Dr in portfolio)

Ent.
H.C.

3.61